US012288235B2

(12) United States Patent
Inan et al.

(10) Patent No.: US 12,288,235 B2
(45) Date of Patent: Apr. 29, 2025

(54) METHODS AND APPARATUS FOR PREDICTING A USER ACQUISITION EVENT

(71) Applicant: Walmart Apollo, LLC, Bentonville, AR (US)

(72) Inventors: Aysenur Inan, Mountainview, CA (US); Divya Chaganti, San Jose, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 472 days.

(21) Appl. No.: 17/647,297

(22) Filed: Jan. 6, 2022

(65) Prior Publication Data

US 2023/0214903 A1 Jul. 6, 2023

(51) Int. Cl.
*G06Q 30/02* (2023.01)
*G06N 20/00* (2019.01)
*G06Q 30/0601* (2023.01)

(52) U.S. Cl.
CPC ......... *G06Q 30/0631* (2013.01); *G06N 20/00* (2019.01)

(58) Field of Classification Search
CPC ........... G06Q 30/0631; G06Q 30/0201; G06N 20/00; G06N 3/044; G06N 3/0464; G06N 3/08; G06N 5/01; G06N 20/20
See application file for complete search history.

(56) References Cited

U.S. PATENT DOCUMENTS

| 8,712,828 | B2 | 4/2014 | Maga et al. | |
|---|---|---|---|---|
| 10,455,378 | B2* | 10/2019 | Rakovitsky | G06F 11/3438 |
| 10,469,275 | B1* | 11/2019 | Broomall | H04L 51/52 |
| 10,482,491 | B2 | 11/2019 | Li et al. | |
| 2003/0200135 | A1 | 10/2003 | Wright | |
| 2015/0332308 | A1* | 11/2015 | Liu | G06Q 30/0242 705/14.41 |
| 2017/0221090 | A1 | 8/2017 | Li et al. | |
| 2018/0332447 | A1* | 11/2018 | Rakovitsky | H04W 4/14 |
| 2019/0102820 | A1 | 4/2019 | Gupta | |

(Continued)

OTHER PUBLICATIONS

University of Chicago, "Customer Retention under Imperfect Information" (Year: 2020).*

(Continued)

*Primary Examiner* — Breffni Baggot
(74) *Attorney, Agent, or Firm* — Morgan, Lewis & Bockius LLP; Manita Rawat

(57) ABSTRACT

In some examples, a system may be configured to obtain a set of features of a set of users including one or more features of transactional data of the set of users and one or more features of engagement data of the set of users. Additionally, the system may be configured to implement a first set of operations that generate output data including a plurality of trial membership scores, based on the set of features. In some examples, each trial membership score of the plurality of trial membership scores are associated with a particular user of the set of users and characterize a likelihood of an acquisition event of the corresponding user changing from a non-member status to a trial member status.

20 Claims, 6 Drawing Sheets

(56) References Cited

U.S. PATENT DOCUMENTS

| | | | |
|---|---|---|---|
| 2019/0213511 | A1 | 7/2019 | Higgins et al. |
| 2019/0333092 | A1 | 10/2019 | Goyal et al. |
| 2019/0347675 | A1 | 11/2019 | Yang et al. |
| 2020/0134648 | A1 | 4/2020 | Qui et al. |
| 2020/0167798 | A1 | 5/2020 | Lee et al. |
| 2020/0242640 | A1 | 7/2020 | Nielsen et al. |
| 2020/0267449 | A1 | 8/2020 | Hoffman |
| 2020/0273050 | A1 | 8/2020 | Doherty |
| 2021/0081468 | A1* | 3/2021 | Raman .............. G06F 16/958 |
| 2021/0103940 | A1* | 4/2021 | Giglio .............. G06Q 40/12 |
| 2021/0182956 | A1 | 6/2021 | Rao |
| 2021/0406743 | A1* | 12/2021 | Liu .............. G06N 20/20 |
| 2021/0406931 | A1* | 12/2021 | Liu .............. G06N 20/00 |
| 2022/0004885 | A1 | 1/2022 | Yamada et al. |
| 2022/0253490 | A1* | 8/2022 | Tai .............. G06F 16/958 |
| 2022/0327625 | A1 | 10/2022 | Leung et al. |
| 2023/0094635 | A1 | 3/2023 | Meng et al. |

OTHER PUBLICATIONS

M. McDonnell, "Deep Learning for Customer Churn Prediction," Moz Developer Blog, https://moz.com/devblog/deep-learning-for-customer-churn-prediction, May 19, 2015, 6 pages.

"Demystifying Black-Box Models with SHAP Value Analysis," https://www.datasciencecentral.com/demystifying-black-box-models-with-shap-value-analysis, May 15, 2018, 2 pages.

S. Xiang, "Understanding different high risk groups by using SHAP values, but not just SHAP values," https://medium.com/@vanillaxiangshuyang/understanding-different-high-risk-groups-by-using-shap-values-but-not-just-shap-values-358eb6f815da, Aug. 23, 2021, 5 pages.

\* cited by examiner

METHODS AND APPARATUS FOR PREDICTING A USER ACQUISITION EVENT

TECHNICAL FIELD

The disclosure relates to methods and apparatuses for predicting a user acquisition event.

BACKGROUNDS

At least some e-commerce entities may provide different platforms to enable customers to place orders or purchase items the e-commerce entities provide. In various examples, such platforms may include, an online platform, such as retailer websites, as well as an in-store platform. Generally, an e-commerce entity may provide incentives to some of its customers, such as free shipping and/or discounts for particular items. Additionally, such an e-commerce entity may provide loyalty or membership programs that, upon joining, may enable the customer to have access to such incentives. Further, the e-commerce entity may provide a trial loyalty or membership program that enables non-member customers to try such loyalty or membership programs for a predetermined period of time. Such trial loyalty or membership programs may have limited access to such incentives (e.g., partial access or less discounted rates compared to the full membership or loyalty program).

Conventionally, for at least online e-commerce platforms, such as a retailer website, the corresponding e-commerce entities may provide a system that may promote such trial loyalty or membership programs to any customer or user who has interacted with the online e-commerce platform. However, such conventional systems may waste computational resources as not all the customers are interested in participating or joining the trial-membership program. Further, since such conventional systems are not determining which customers have a higher likelihood of joining such trial loyalty or membership programs, customer satisfaction of many customers who may not have any desire to join the trial loyalty or membership programs may be reduced because such customers, while accessing the online e-commerce platform may be bombarded with content promoting the trial membership or loyalty programs.

SUMMARY

The embodiments described herein are directed to a computing system that determines/predicts, for each user or customer of an e-commerce entity, an occurrence of a user acquisition event. In various examples, a user acquisition event may include, for a particular user of an online ecommerce platform, changing from a non-member status to a trial-member status. Additionally, the computing system may also determine factors or parameters that contributed to such a determination/prediction. Further, the computing system may utilize such determinations and predictions to determine which customers or users to communicate trial membership or loyalty content items to and what specific trial membership or loyalty content items to communicate to the customers or users (e.g., the computing system may, for a non-member customer that doesn't utilize scheduled deliveries, communicate content items related to a coupon for scheduled deliveries). Such a computing system may leverage data that is already obtained and received by other computing systems, such as computing systems associated with the online platform of the e-commerce entity or the transactional or payment computing systems of an associated store, to make such determinations/predictions.

In accordance with some embodiments, exemplary computing systems may be implemented in any suitable hardware or hardware and software, such as in any suitable computing device. In some embodiments a system may include a memory resource storing instructions and one or more processors coupled to the memory resource. In some examples, the one or more processors may be configured to execute the instructions to obtain a set of features of a set of users including one or more features of transactional data of the set of users and one or more features of engagement data of the set of users. Additionally, the one or more processors may be configured to execute the instructions to, implement a first set of operations that generate output data including a plurality of trial membership scores, based on the set of features. In some examples, each trial membership score of the plurality of trial membership scores being associated with a particular user of the set of users and characterize a likelihood of an acquisition event of the corresponding user changing from a non-member status to a trial member status. Moreover, the one or more processors may be configured to execute the instructions to, based on the output data and multiple predetermined trial membership score cohorts, sort a user identifier of each of the set of users into one of the multiple predetermined trial membership score cohorts. In some examples, each of the multiple predetermined trial membership score cohorts represents one of multiple predetermined range of trial membership scores. Further, the one or more processors may be configured to execute the instructions to for at least a first predetermined trial membership score cohort of the multiple predetermined trial membership score cohorts, implement a second set of operations that generate explainability data associated with at least the first predetermined trial membership score cohort.

In other embodiments, a computer-implemented method is provided that includes obtaining a set of features of a set of users including one or more features of transactional data of the set of users and one or more features of engagement data of the set of users. Additionally, the computer-implemented method includes implementing a first set of operations that generate output data including a plurality of trial membership scores, based on the set of features. In some examples, each trial membership score of the plurality of trial membership scores being associated with a particular user of the set of users and characterize a likelihood of an acquisition event of the corresponding user changing from a non-member status to a trial member status. Moreover, the computer-implemented method includes, based on the output data and multiple predetermined trial membership score cohorts, sorting a user identifier of each of the set of users into one of the multiple predetermined trial membership score cohorts. In some examples, each of the multiple predetermined trial membership score cohorts represents one of multiple predetermined range of trial membership scores. Further, the computer-implemented method includes, for at least a first predetermined trial membership score cohort of the multiple predetermined trial membership score cohorts, implementing a second set of operations that generate explainability data associated with at least the first predetermined trial membership score cohort.

In various embodiments, a non-transitory computer readable medium has instructions stored thereon, where the instructions, when executed by the at least one or more processors, cause a system to, obtain a set of features of a set of users including one or more features of transactional data of the set of users and one or more features of engagement data of the set of users. Additionally, the system may be configured to, implement a first set of operations that generate output data including a plurality of trial membership scores, based on the set of features. In some examples, each trial membership score of the plurality of trial membership scores being associated with a particular user of the set of users and characterize a likelihood of an acquisition event of the corresponding user changing from a non-member status to a trial member status. Moreover, the system may be configured to, based on the output data and multiple predetermined trial membership score cohorts, sort a user identifier of each of the set of users into one of the multiple predetermined trial membership score cohorts. In some examples, each of the multiple predetermined trial membership score cohorts represents one of multiple predetermined range of trial membership scores. Further, the system may be configured to execute the instructions to for at least a first predetermined trial membership score cohort of the multiple predetermined trial membership score cohorts, implement a second set of operations that generate explainability data with at least the first predetermined trial membership score cohort.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
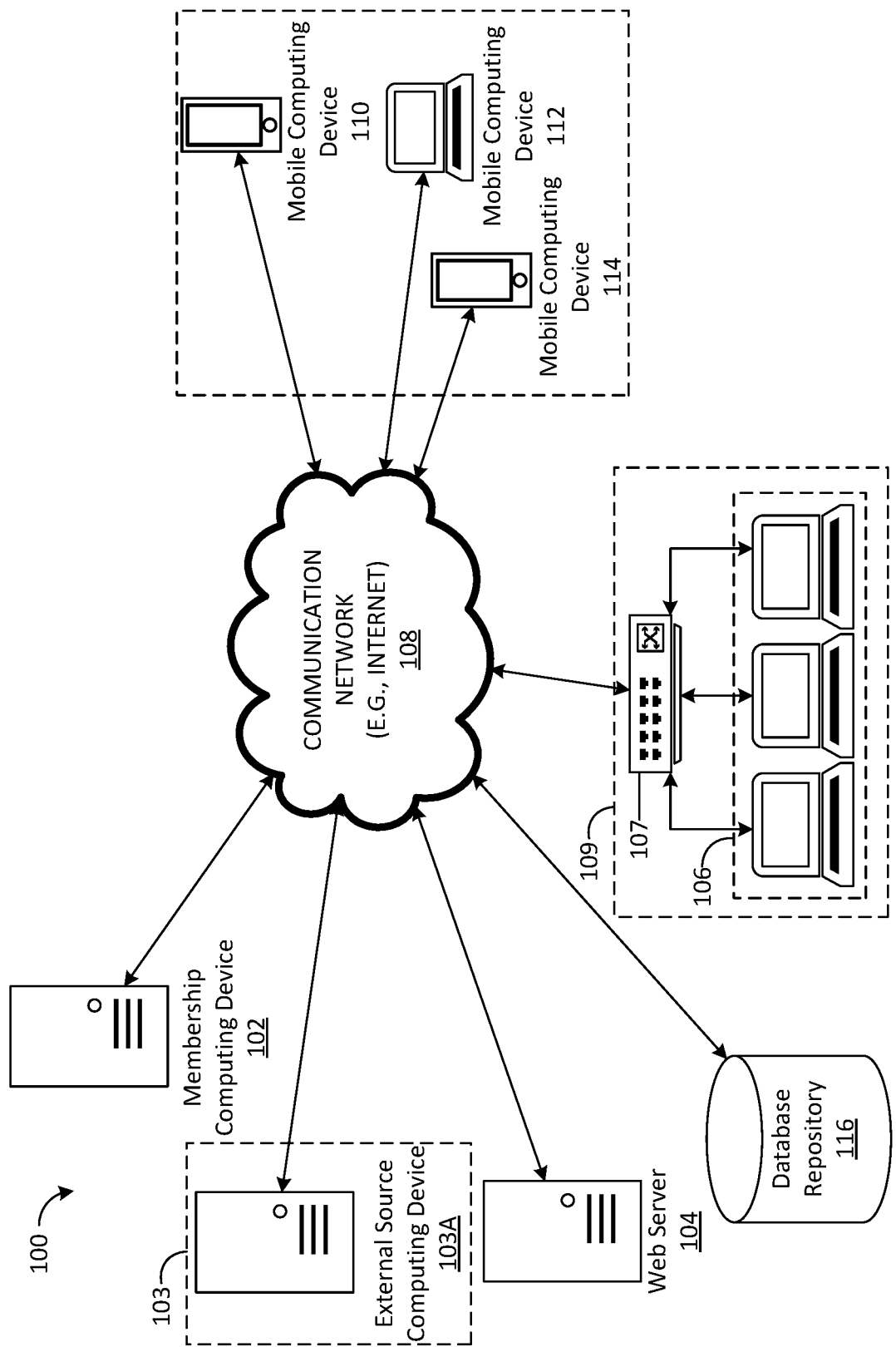
FIG. 1 is a block diagram of an example membership system that includes a membership computing device.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

FIG. 1 illustrates a block diagram of an example membership system 100 that includes membership computing device 102 (e.g., a server, such as an application server), external source system 103, a web server 104, data repository 116, and multiple customer mobile computing devices 110, 112, and 114, operatively coupled over communication network 108. Membership computing device 102, web server 104 and multiple customer mobile computing devices 110, 112, and 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 108.

In some examples, membership computing device 102 can be a computer, a workstation, a laptop, a server such as a cloud-based server, or any other suitable device. In some examples, each of multiple customer mobile computing devices 110, 112, and 114 can be a cellular phone, a smart phone, a tablet, a personal assistant device, a voice assistant device, a digital assistant, a laptop, a computer, or any other suitable device. In some examples, membership computing device 102 is operated by a retailer, and multiple customer mobile computing devices 110, 112, and 114 are operated by customers of the retailer.

Although FIG. 1 illustrates three customer mobile computing devices 110, 112, and 114, membership system 100 can include any number of customer mobile computing devices 110, 112, 114. Similarly, membership system 100 can include any number of membership computing device 102, web server 104, and data repository 116.

Membership system 100 may include workstation(s) 106. Workstation(s) 106 are operably coupled to communication network 118 via router (or switch) 107. Workstation(s) 106 and/or router 107 may be located at particular store associated with membership system 100, such as a store 109. Workstation(s) 106 can communicate with membership computing device 102 over communication network 108. Workstation(s) 106 may send data to, and receive data from, membership computing device 102. In some examples, workstation(s) 106 may transmit purchase data related to orders purchased by customers at a particular store, such as store 109, to membership computing device 102. In other examples, workstation(s) 106 may transmit benefit data associated with a particular store, such as store 109, to membership computing device 102. In some examples benefit data may characterize one or more membership benefits that are provided by the particular store, and that are available to customers or are accessible to customers, such as scan and go and fuel discounts. Further, membership computing device 102 may store in data repository 116, data characterizing, membership benefits that are available or accessible to the particular store (e.g., scan and go capabilities, fuel pumps and associated fuel discounts, etc.), within a corresponding data repository 116, such as benefits data. Additionally, membership computing device 102 may also store a store identifier of the store, such as an alphanumeric identifier, and geolocation data of the store, such as an address and/or longitudinal and latitudinal coordinates, within a corresponding data repository 116, such as benefits data.

In various examples, workstation(s) 109 may transmit store data of a particular store, such as store 109. In such examples, store data may indicate store features or characteristics of a particular store. For example, a store feature of the particular store, such as store 109, may include that the particular store is "scan and go" capable (e.g., a customer at store 109 may utilize an application program executing on their respective mobile device to scan an item and purchase an item without needing to go to a physical cashier). In another example, a store feature of the particular store may include that the particular store is pickup capable (e.g., the particular store is associated with services that allows customers to order items for a future time interval, at which the customer can come to the particular store to pick up their orders). In yet another example, a store feature of the particular store may include that the particular store has one or more available fuel stations. Further, membership computing device 102 may store in data repository 116, data characterizing, the store features or characteristics of the particular store, such as store 109, within a corresponding data repository 116, such as store data.

In various implementations, membership computing device 102 may determine one or more membership benefits that are available to a particular store, such as store 109, or accessible for customers of the particular score, based on store data of the particular store. For example, membership computing device 102 may compare the store features indicated by store data of a particular store and all the membership benefits that are provided by the associated e-commerce entity. Additionally, membership computing device 102 may determine which membership benefits may be available for the particular store based on which store features match the membership benefits that are provided by the associated e-commerce entity. For instance, membership computing device 102 may determine that fuel discounts (the membership benefits) are available to store 109 because store 109 has available fuel pumps. In such an example, the e-commerce entity, may, from another system or database (not shown in FIG. 1), transmit membership data including benefit data that identifies all the membership benefits that are provided by the e-commerce entity. Further, membership computing device 102 may store in data repository 116, data characterizing, membership benefits that are available or accessible to a particular store, such as store 109, within a corresponding data repository 116, such as benefits data.

In some implementations, membership computing device 102 may determine whether a customer or a user of e-commerce entity is currently participating or not participating in a loyalty or membership program (trial or full). In some examples, member data generated by the e-commerce entity may include data identifying a plurality of users or customers of the e-commerce entity that are currently or have previously participated in the loyalty or membership program. Additionally, elements of the member data may include, but are not limited to, a unique identifier of a particular one of the customers of the e-commerce entity that has currently or previously participated in the loyalty or membership program (e.g., an alphanumeric identifier or login credential, a customer name, etc.), a label or tag identifying whether the particular customer is currently or previously a trial or full member, a timestamp indicating when the user joined the loyalty or membership program, information identifying the type of loyalty or membership program the particular customer signed up for (e.g., trial—15 day, trial 30 day, monthly full membership, and yearly full membership), and information identifying the remaining amount of time of a currently active membership of the particular customer. Further, membership computing device 102 may determine which customers or users of e-commerce entity is currently participating in a loyalty or membership program based on the member data and the current time and/or date. For example, membership computing device 102 may determine that the current time and/or date is Nov. 15, 2021. Additionally, for a particular user identified in the member data, membership computing device 102 may determine that the particular user joined a monthly full-membership loyalty or membership program on Oct. 1, 2021 and had renewed their membership on Nov. 1, 2021 based on member data of the particular user. Based on the current time and/or data and the member data of the particular user, membership computing device 102 may determine that the particular user is currently (or at least on Nov. 15, 2021) participating in the loyalty or membership program.

Additionally, membership computing device 102 may determine which customer or users of e-commerce entity is not currently participating in the loyalty or membership program by comparing the user identifiers of the member data and the user identifiers of the user database (e.g., transactional data, and/or engagement data). For example, membership computing device 102 may determine that a particular user is not currently participating in the loyalty or membership program if the user identifier of the particular user exists in the user database but not in the member data. Additionally, membership computing device 102 may determine a particular user is not currently participating in the loyalty or membership program if based on the current time and/or date and the member data of the particular user. For example, membership computing device 102 may determine that the current time and/or date is Sep. 15, 2021. Additionally, for a particular user identified in the member data, membership computing device 102 may determine that the particular user joined a monthly full-membership loyalty or membership program on Jan. 1, 2020 and had renewed their membership on every month until Mar. 1, 2021. Based on member data of the particular user. Based on the current time and/or data and the member data of the particular user, membership computing device 102 may determine that the particular user is not currently (or at least on Sep. 15, 2021) participating in the loyalty or membership program. Further, membership computing device 102 may store in data repository 116, data of user identifiers of users or customers of e-commerce entity not currently participating in the loyalty or membership program (e.g., non-members), within a corresponding data repository 116, such as non-member data. In some examples, the data of user identifiers of non-member users may include a tag or label indicating the associated user or customer is a non-member.

Although FIG. 1 illustrates a single store 109, membership system 100 may include any number of stores, including store 109. Additionally, each store may include a computing system comprising workstations similar to workstation(s) 106. In implementations where membership system 100 includes multiple stores 109, data transmitted to membership computing device 102 may include identifying information associated with a particular store 109. For example, workstation 106 of a particular store 109 may transmit membership data and/or store data of the particular store 109 to membership computing device 102. Additionally, workstation(s) 106 may each transmit location data (e.g., an address, geographical coordinates, etc.) and/or a stored identifier associated with and/or corresponding to the particular store 109, to membership computing device 102.

In some examples, membership computing device 102 may determine which of the one or more stores 109 associated with an e-commerce entity, a particular users or customer purchases items from. In such example, the transactional data of a particular user/customer may, for each order or purchase order, include one or more elements identifying a location (e.g., an address, geographical coordinates, etc.) and/or a stored identifier associated with and/or corresponding to the particular store 109. Based on such data elements, membership computing device 102 may generate data identifying particular stores 109 the particular customer/user has purchased from. Further, membership computing device 102 may determine and generate such data elements for non-member users. For example, based on each user identifier identified in the non-member data and associated transactional data, membership computing device 102 may generate data identifying, for each non-member user, particular stores 109 the associated user/customer has purchased from. In such an example, membership computing device 102 may store, data identifying, for each non-member user, particular stores 109 the associated non-member user/customer has purchased from, within a user database, such as non-member data.

Web server 104 may host one or more web pages, such as a retailer's website. The website may allow for the purchase of items. Web server 104 may transmit transactional data related to orders purchased on the website by customers to membership computing device 102. In some examples, membership computing device 102 may, in response to and based on the received transactional data, each of the one or more orders to determine one or more items purchased in each of the one or more orders and a corresponding customer. Further, membership computing device 102 may store in data repository 116, data characterizing each of the one or more orders, the corresponding customer (e.g., by customer or visitor ID), the corresponding one or more items, and the associated item type within a corresponding data repository 116, such as transactional data.

In some examples, web server 104 transmits user session data to membership computing device 102. The user session data identifies events associated with browser sessions and may include user interaction or engagement data characterizing events such as, add-to-cart, click events, view events, and impressions associated with a corresponding user. Additionally, in response to and based on receiving user session data, membership computing device 102 may determine add-to-to cart events, click events, view events, and impressions associated with a corresponding user. Further, membership computing device 102 may store in data repository 116, data characterizing add-to-to cart events, click events, view events, and impressions associated with a corresponding customer, within a corresponding data repository 116, such as engagement data.

First customer mobile computing device 110, second customer mobile computing device 112, and N$^{th}$ mobile computing device 114 may communicate with web server 104 over communication network 108. For example, each of multiple mobile computing devices 110 and 112 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple mobile computing devices 110, 112 may access the website and perform a search for items on the website by entering in one or more terms into the search bar. In response, the website may return search results identifying one or more items, as described above and further herein. Web server 104 may also transmit search query data to membership computing device 102. The search query data may identify, for each user/customer, a search query provided by the customer as well as the associated returned search results.

Membership computing device 102 is operable to communicate with data repository 116 over communication network 118. For example, membership computing device 102 can store data to, and read data from, data repository 116. Data repository 116 can be a remote storage device, such as a cloud-based server, a disk (e.g., a hard disk), a memory device on another application server, a networked computer, or any other suitable remote storage. Although shown remote to membership computing device 102, in some examples, data repository 116 can be a local storage device, such as a hard drive, a non-volatile memory, or a USB stick. Membership computing device 102 may store purchase/transactional data, store data, and membership data received from store 109 and/or web server 104 in data repository 116. Membership computing device 102 may also store user session data identifying events associated with browsing sessions, such as when a customer browses a website hosted by web server 104. In some examples, the user session data may include user interaction or engagement data characterizing events, such as, add-to-cart events, click events, view events, search query data, and impressions associated with a corresponding customer. In various examples, the user session data may identify events associated with browsing sessions of webpages associated with a membership or loyalty program (e.g., user interaction or engagement data obtained from browsing sessions of pages associated with a membership or loyalty program characterizing events, such as, add-to-cart events, click events, view events, search query data, and impressions associated with a corresponding customer).

In some examples, data repository 116 may store supplemental user data generated by external source computing device 103A of external source system 103. In some instances, the elements of the supplemental user data for a particular one of the customers of the e-commerce entity may include, but are not limited to, a unique identifier of the particular customer (e.g., an alphanumeric identifier or login credential, a customer name, etc.), information identifying one or more vehicles currently or previously held by the particular customer, information identifying one or more occupations current or previously held by the particular customer, information identifying the educational level of the particular customer, and information identifying one or more features of the customer, such as the age of the customer.

In some examples, data repository 116 may store one or more machine learning models that, when adaptively trained and validated, may be executed by membership computing device 102 to determine and generate output data associated with a particular user or customer labeled or designated as a non-member (or non-member user). The output data may include a plurality of trial membership scores. Each trial membership score of the plurality of trial membership scores may be associated with a particular non-member user and may characterize a likelihood of an acquisition event of the corresponding non-member user changing from a non-member status to a trial-member status. Additionally, membership computing device 102 may implement operations that generate the output data by applying a trained and validated machine learning model to one or more extracted features or data. In various examples, the features or data may be extracted or generated from one or more elements of transactional data, engagement data, supplemental user data, member data, benefits data and/or store data.

In some examples, additional extracted, derived or obtained features or data that may be ingested by the trained and validated machine learning model to generate the output data includes consolidate data. In such examples, membership computing device 102 may determine and generate, from one or more elements of transactional data and for each user/customer of an e-commerce entity, consolidated data. In some instances, consolidated data may include, but are not limited to, total number of transactions of a particular one of the customers of the e-commerce entity for a predetermined interval(s) of time (e.g., 1 month, 2 months or 3 months), total amount spent on purchases by the particular customer for a predetermined interval of time, time-average number of items purchased by the particular customer for a predetermined interval of time, time-average amount saved due to various discounts, incentives and benefits offered by the e-commerce entity. Further, membership computing device 102 may store in data repository 116, the consolidated data, within a corresponding data repository 116, such as consolidated data.

In other examples, additional extract, derived or obtained features or data that may be ingested by the trained and validated machine learning model to generate the output data includes fulfillment data. In such examples, membership computing device 102 may determine and generate, from one or more elements of transactional data and for each user/customer of an e-commerce entity, fulfillment data. Fulfillment data may indicate how the purchase order of the particular one of the customers of the e-commerce entity was fulfilled (e.g., scheduled delivery, scheduled pick up, etc.), the total and/or time-average amount spent on purchases by the particular customer and associated with a completed scheduled delivery, the total an/or time-average amount spent on purchases by the particular customer and associated with a completed scheduled pickup, the total and/or time-average number of items purchased by the particular customer and associated with a completed scheduled delivery, the total and/or time-average number of items purchased by the particular customer and associated with a completed scheduled pickup, the total and/or time-average amount spent on purchases by the particular customer and associated with a cancelled scheduled delivery, the total an/or time-average amount spent on purchases by the particular customer and associated with a cancelled scheduled pickup, the total and/or time-average number of items purchased by the particular customer and associated with a cancelled scheduled delivery, and the total and/or time-average number of items purchased by the particular customer and associated with a cancelled scheduled pickup. Further, membership computing device 102 may store in data repository 116, the fulfillment data, within a corresponding data repository 116, such as fulfillment data.

In various examples, additional extract, derived or obtained features or data that may be ingested by the trained and validated machine learning model to generate the output data includes inter-purchase interval data. In such examples, membership computing device 102 may determine and generate, from one or more elements of transactional data and for each user/customer of an e-commerce entity, inter-purchase interval data. Inter-purchase interval data may indicate the average number of days between each purchase made by the particular one of the customers (e.g., in-store and/or online). Further, membership computing device 102 may store in data repository 116, the inter-purchase interval data, within a corresponding data repository 116, such as inter-purchase interval data In some examples, membership computing device 102 may determine and generate explainability data associated output data generated by a trained and validated machine learning model that generated the output data. Explainability data may include a set of values and the set of values may include multiple subsets of values. Each subset of values may be associated with one of the extracted features or data that were inputs to the trained and validated machine learning model. Moreover, each value of a subset of values may be associated with a particular non-member user, and may characterize a contribution of the corresponding feature to the output data generated by the trained and validated machine learning model. In some examples, each value may each indicate the magnitude of the contribution the corresponding feature may have had on the output generated by the trained and validated machine learning model. Additionally, each value may indicate whether such contribution may have had a negative or positive contribution to the generated output data. In other examples, membership computing device 102 may implement a set of operations that generate the explainability data. In some instances, membership computing device 102 may apply a SHapley Additive explanations (SHAP) model to the trained and validated machine learning model. Further, membership computing device 102 may store in data repository 116, the explainability data, within a corresponding data repository 116, such as explainability data.

In various implementations, membership computing device 102 may generate explainability data for non-member users that are more likely to join or participate in a loyalty or membership program of an e-commerce entity. In such implementations, membership computing device 102 may, for each non-member user of the e-commerce entity, associate with or place into one of a set of bins/cohorts, based on the trial-membership score of the corresponding non-member user or customer. Each bin/cohort may correspond to a predetermined range of trial-membership scores. For example, a cohort of 0.0-0.099 may correspond to non-member users with a determined trial-membership score ranging between 0.0-0.099; a cohort of 0.1-0.199 may correspond to non-member users with a determined trial-membership score ranging between 0.1-0.199; a cohort of 0.2-0.299 may correspond to non-member users with a determined trial-membership score ranging between 0.2-0.299; a cohort of 0.3-0.399 may correspond to non-member users with a determined trial-membership score ranging between 0.3-0.399; a cohort of 0.4-0.499 may correspond to non-member users with a determined trial-membership score ranging between 0.4-0.499; a cohort of 0.5-0.599 may correspond to non-member users with a determined trial-membership score ranging between 0.5-0.599; a cohort of 0.6-0.699 may correspond to non-member users with a determined trial-membership score ranging between 0.6-0.699; a cohort of 0.7-0.799 may correspond to non-member users with a determined trial-membership score ranging between 0.7-0.799; a cohort of 0.8-0.899 may correspond to non-member users with a determined trial-membership score ranging between 0.8-0.899; and a cohort of 0.9-1.0 may correspond to non-member users with a determined trial-membership score ranging between 0.9-1.0. Further, and in such implementations, membership computing device 102 may generate explainability data for non-member users in bins/cohorts which a predetermined range of trial membership scores above 0.5 or (50%). Additionally, membership computing device 102 may store in data repository 116, the explainability data, within a corresponding data repository 116, such as explainability data.

In some examples, membership computing device 102 may implement a set of operations that determine and generate explainability data for a particular bin/cohort. For example, membership computing device 102 may determine explainability data for a cohort of 0.6-0.699. Additionally, the explainability data may include a set of values associated with output data including trial-membership scores ranging between 0.6-0.699 and the set of values may include multiple subsets of values. Each subset of values may be associated with one of the extracted features or data that were inputs to the trained and validated machine learning model. Moreover, each value of a subset of values may be associated with a particular non-member user with a trial membership score within the range of 0.6-0.699, and may characterize a contribution of the corresponding feature to the generated trial-membership scores ranging between 0.6-0.699. In some examples the values may each indicate the magnitude of the contribution the corresponding feature may have had on such trial-membership scores, as well as whether such contribution may have had a negative or positive contribution to such trial-membership scores. In some instances, membership computing device 102 may apply a SHAP model to the trained and validated machine learning model that generated output data associated with a particular bin/cohort, such as a bin/cohort that corresponds to a trial-membership score ranging from 0.6-0.699. Further, membership computing device 102 may store in data repository 116, the explainability data, within a corresponding data repository 116, such as explainability data.

In some examples, membership computing device 102 may implement a set of operations that determine and generate explainability data for a particular non-member user/customer. For example, membership computing device 102 may determine explainability data for a particular non-member user/customer with output data including a trial-membership score of 0.85. Additionally, the explainability data may include a set of values associated with the output data of the particular non-member customer. Moreover, each value of the set of values may be associated with one of the extracted features or data that were inputs to the trained and validated machine learning model that generated the trial-membership score of the particular user. In such an example, the extracted features or data may be associated with the particular non-member user (e.g., extracted features of transactional data associated with the particular non-member user). Further, each value may characterize a contribution of the corresponding feature or data to the generated trial-membership score associated with the particular user. In some examples the values may each indicate the magnitude of the contribution the corresponding feature may have had on the trial-membership score associated with the particular user, as well as whether such contribution may have had a negative or positive contribution to the trial-membership score associated with the particular user. In some instances, membership computing device 102 may apply a SHAP model to the trained and validated machine learning model that generated output data including the trial-membership score associated with the particular user. Further, membership computing device 102 may store in data repository 116, the explainability data, within a corresponding data repository 116, such as explainability data. In various examples, the particular non-member user may be associated with a particular bin/cohort. For example, the particular non-member user may have an associated output data including a trial-membership score of 0.85. Further, the trial membership score of 0.85 of the particular non-member user may be put into or be associated with a bin/cohort corresponding to a trial-membership score range of 0.8-0.899.

For each feature and associated values of explainability data, membership computing device 102 may, for a particular one of non-member users of an e-commerce entity, determine whether to implement operations associated with an actionable feature. As described herein, an actionable feature, is an extracted, derived, or obtained feature of the particular non-member user that, are modifiable through operations implemented by the membership computing device 102. Additionally, if the extracted, derived or obtained feature is modified, the modification of such feature may increase or decrease a trial-membership score of the particular non-member user. Examples of actionable features include, transactional and engagement type features or features that are extracted, obtained or derived from transactional data and engagement data (e.g., consolidated data, fulfillment data, and inter-purchase interval data).

In some examples, membership computing device 102 may determine whether to implement operations associated with an actionable feature by comparing explainability data of the particular non-member user to the explainability data of a bin/cohort with a higher range of trial-membership scores. Examples of operations that may be implemented by the membership computing device 102 include, triggering a notification on the mobile computing device (e.g., mobile computing device 110, 112, 114) of the non-member user that is related to the actionable feature, triggering communications, such as emails, to the mobile computing device (e.g., mobile computing device 110, 112, 114) of the non-member user that is related to the actionable feature, and causing a website/webpage of an associated e-commerce entity, that is displayed on the mobile computing device (e.g., mobile computing device 110, 112, 114) of the non-member user, to generate particular graphical features or content items (e.g., a banner) related to the actionable feature and/or the loyalty or membership program.

In some implementations, an analyst may be given data to analyze extracted, derived or obtained features and data of output data of particular non-member users. In some examples, the output data of the particular non-member users may include trial member scores that are below 0.5 (e.g., are determined to not likely become a trial member). In such implementations, membership computing device 102 may transmit explainability data of such non-member users to a mobile computing device (not shown) operated by an analyst. Additionally, the mobile computing device of the analyst may generate, for a particular one of the non-member users that have trial-membership scores below 0.5, a graphical representation of the distribution of the set of values included in explainability data associated with that particular non-member user. Based on the graphical representation, the analyst and/or the mobile computing device of the user may make one or more determinations as to which extracted and derived features and data of the particular non-member user is contributing the most (negatively or positively) to the trial-membership score of the particular non-member user. As such, the analyst may further make determinations as to why the particular non-member user is not likely to participate or join a trial membership or loyalty program.

In some examples, a mobile computing device of an analyst may generate a graphical representation of the distribution of extracted and/or derived features and data of all non-member users that have trial-membership scores below 0.5. In such examples, the graphical representation may display for each feature, feature values of the non-member users that have trial-membership scores below 0.5. Additionally, membership computing device 102 may transmit explainability data of all non-member users with a trial membership score within 0 and 0.5, to the mobile computing device of the analyst. Further, the mobile computing device of the analyst may generate the graphical representation of the distribution of extracted and/or derived features and data of all non-member users that have trial-membership scores below 0.5 based on the received explainability data.

In other examples, a mobile computing device of an analyst may, for each of one or more bin/cohorts with corresponding trial-membership score ranges within 0 and 0.5, a graphical representation of the distribution of extracted and/or derived features and data of non-member users of the corresponding bin/cohort. In such examples, membership computing device 102 may transmit explainability data of non-member users with a trial membership score within 0 and 0.5, along with data identifying one or more bins/cohorts with corresponding trial-membership score ranges within 0 and 0.5 and associated non-member users to the mobile computing device of the analyst. Further, membership computing device 102 may generate the graphical representations of the distribution of extracted and/or derived features and data of non-member users of each bin/cohort, based on the received explainability data and data identifying the cohorts/bins.

Figure 2:
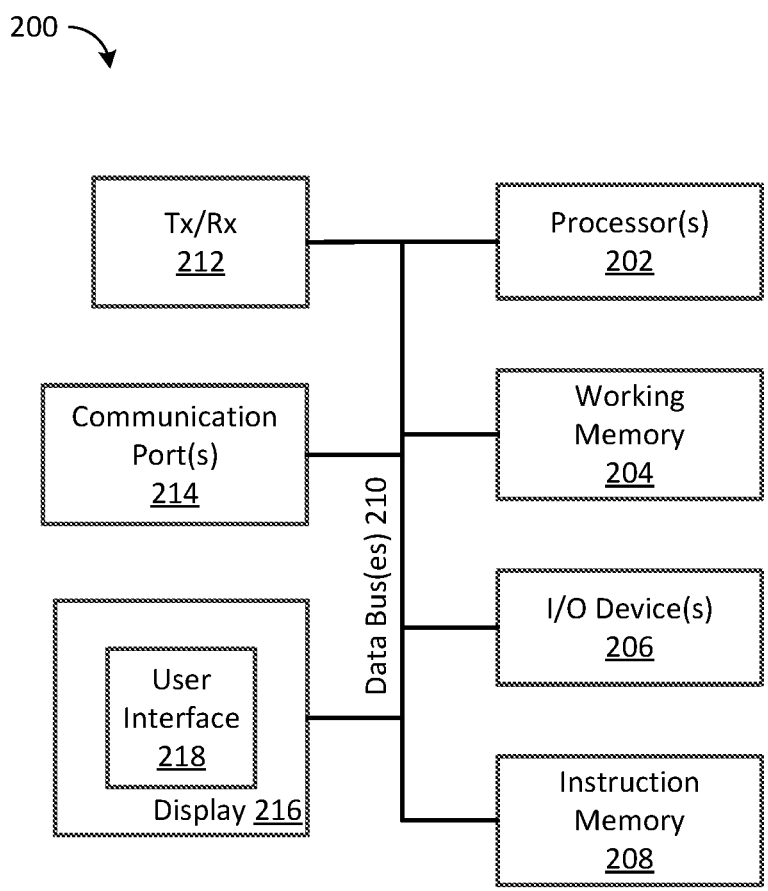
FIG. 2 illustrates a block diagram of example membership computing device of FIG. 1 in accordance with some embodiments.

FIG. 2 illustrates a block diagram of example membership computing device 102 of FIG. 1. Membership computing device 102 can include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 202 can be configured to perform a certain function or operation by executing code, stored on instruction memory 208, embodying the function or operation. For example, processors 202 can be configured to execute code stored in instruction memory 208 to perform one or more of any function, method, or operation disclosed herein.

Additionally, processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of membership computing device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as interaction data, product data, and/or keyword search data.

Display 216 can display user interface 218. User interface 218 can enable user interaction with membership computing device 102. For example, user interface 218 can be a user interface for an application of a retailer that allows a customer to view and interact with a retailer's website. In some examples, a user can interact with user interface 218 by engaging input/output devices 206. In some examples, display 216 can be a touchscreen, where user interface 218 is displayed on the touchscreen.

Transceiver 212 allows for communication with a network, such as the communication network 108 of FIG. 1. For example, if communication network 108 of FIG. 1 is a cellular network, transceiver 212 is configured to allow communications with the cellular network. In some examples, transceiver 212 is selected based on the type of communication network 108 membership computing device 102 will be operating in. Processor(s) 202 is operable to receive data from, or send data to, a network, such as communication network 108 of FIG. 1, via transceiver 212.

User Acquisition Event Prediction Determination

Figure 3:
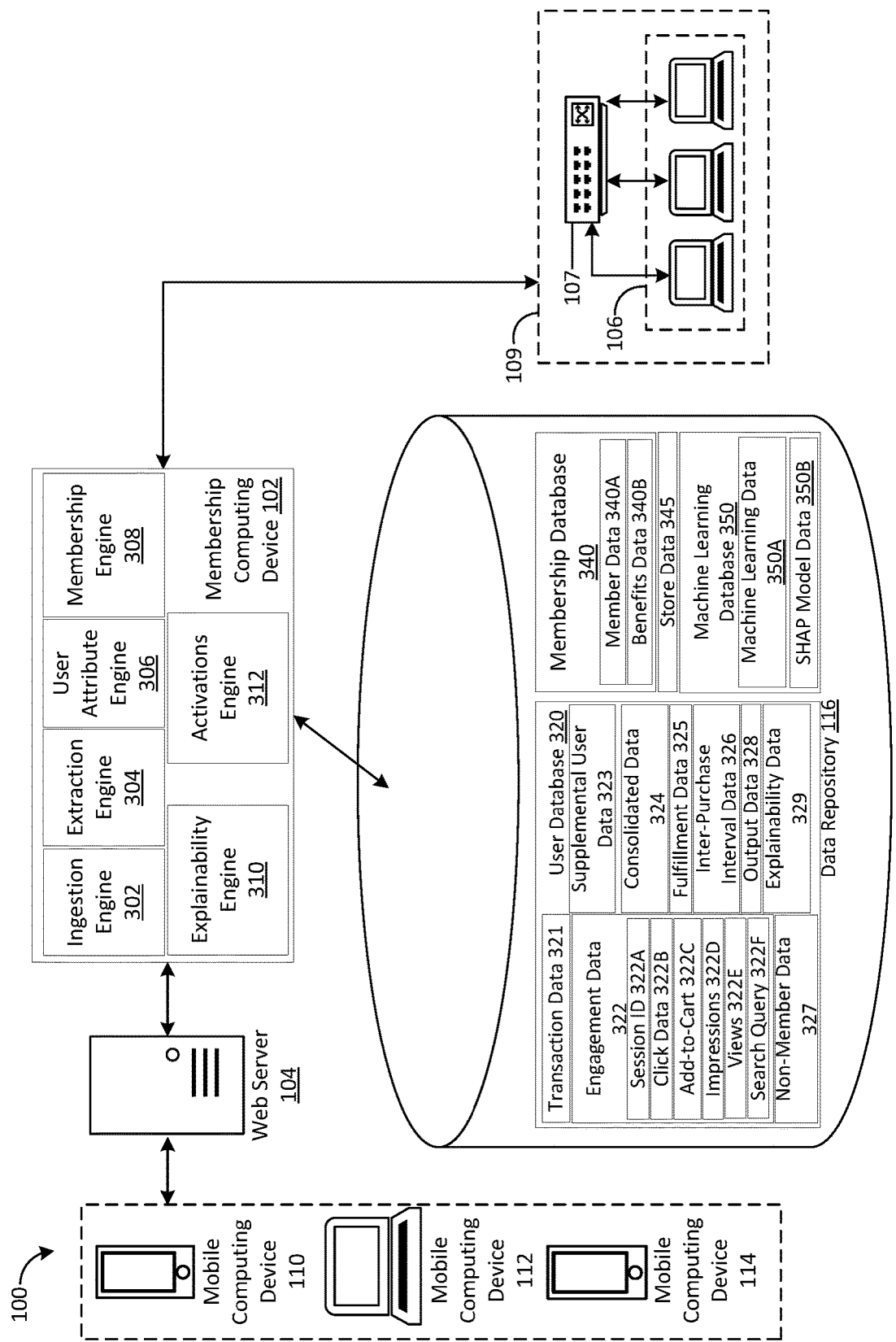
FIG. 3 is a block diagram illustrating examples of various portions of the membership computing device of FIG. 1 in accordance with some embodiments.

FIG. 3 is a block diagram illustrating examples of various portions of the membership computing device 102. As illustrated in FIG. 3, membership computing device 102 can include ingestion engine 302, extraction engine 304, user attribute engine 306, membership engine 308, and explainability engine 310. In some examples, one or more of ingestion engine 302, extraction engine 304, user attribute engine 306, membership engine 308, and explainability engine 310 may be implemented in hardware. In other examples, one or more of ingestion engine 302, extraction engine 304, user attribute engine 306, membership engine 308, and explainability engine 310 may be implemented as an executable program maintained in a tangible, non-transitory memory, such as instruction memory 208 of FIG. 2, that may be executed by one or processors, such as processor 202 of FIG. 2.

As illustrated in FIG. 3, data repository 116, may include user database 320. In some examples, user database 320 may store one or more data elements of user session data within user database 320. For example, membership computing device 102 may receive user session data from web server 104. Additionally, membership computing device 102, may execute ingestion engine 302 to obtain one or more elements of user session data and store the one or more elements of user session data within user database 320. In some examples, user session data may be related one or more browser sessions of a plurality of users of the online platform (e.g., the website hosted by web server 104). Additionally, user session data may include engagement data 322. Engagement data 322 includes a session ID 322A (i.e., a website browser session identifier), click data 322B identifying click events where the user clicked (e.g., images of items for purchase, keywords to filter reviews for an item) and corresponding timestamps of each click event, add-to-cart data 322C identifying add-to-cart events where the user adds an anchor item to an online shopping cart and corresponding timestamps of each event, impressions data 322D identifying one or more impressions associated with each user/customer of an e-commerce entity, views data 322E identifying view events of webpages the user viewed and corresponding timestamps of each view event, search query data 322F, and user ID data 322G (e.g., a customer ID, visitor ID, etc.) identifying a user ID for each of the plurality of customers of the online platform. In various implementations, each element of click data 322B, add-to-cart data 322C, impressions data 322D, views data 322E and/or search query data 322F may be linked or associated with a particular user ID 322G of a customer.

User database 320 may also store supplemental user data 323. In various implementations, membership computing device 102 may execute ingestion engine 302 to obtain, from external source computing device 103A of external source system 103, one or more elements of supplemental user data 323 and store the one or more elements of supplemental user data 323 within user database 320. In some examples, one or more elements of supplemental user data 323 for a particular one of the users/customers of the e-commerce entity may include but are not limited to, a unique identifier of the particular customer (e.g., an alphanumeric identifier or login credential, a customer name, etc.), information identifying one or more vehicles currently or previously held by the particular customer, information identifying one or more occupations current or previously held by the particular customer, information identifying the educational level of the particular customer, and information identifying one or more features of the customer, such as the age of the customer.

User database 320 may also store user transactional data 321. In some example, membership computing device 102 may receive in-store purchase data identifying and characterizing one or more purchases or purchase orders from one or more stores, such as store 109, associated with one or more user of the online platform. In other examples, membership computing device may receive online purchase data from web server 104, which identifies and characterizes one or more online purchases or purchase orders from an online platform, such as a retailer's website hosted by web server 104. The one or more online purchases may be associated with of one or more users of the online platform. In various implementations, membership computing device 102 may obtain in store-purchase data and/or online purchase data of a particular time interval (e.g., a particular month, year, number of years, etc.). Executed ingestion engine 302 may parse in-store purchase data and online purchase data to generate transactional data 321 of each of the one or more users of the online platform within in user database 320.

User database 320 may also store consolidated data 324. In some examples, consolidated data 324 may be extracted and/or derived from transactional data 321. In some implementations, membership computing device 102 may execute extraction user attribute engine 306 to determine and generate, for each user, consolidated data 324 from transactional data 321. In some examples, consolidated data 324 may include, but are not limited to, total number of transactions of a particular one of the customers of the e-commerce entity for a predetermined interval(s) of time (e.g., 1 month, 2 months or 3 months), total amount spent on purchases by the particular customer for a predetermined interval of time, time-average number of items purchased by the particular customer for a predetermined interval of time, time-average amount saved due to various discounts, incentives and benefits offered by the e-commerce entity.

User database 320 may also store fulfillment data 325. In some examples, fulfillment data 325 may be extracted and/or derived from transactional data 321. In some implementations, membership computing device 102 may execute user attribute engine 306 to determine and generate, for each user, fulfillment data 325 from transactional data 321. In some examples, fulfillment data 325 may indicate how the purchase order of the particular one of the customers of the e-commerce entity was fulfilled (e.g., scheduled delivery, scheduled pick up, etc.), the total and/or time-average amount spent on purchases by the particular customer and associated with a completed scheduled delivery, the total and/or time-average amount spent on purchases by the particular customer and associated with a completed scheduled pickup, the total and/or time-average number of items purchased by the particular customer and associated with a completed scheduled delivery, the total and/or time-average number of items purchased by the particular customer and associated with a completed scheduled pickup, the total and/or time-average amount spent on purchases by the particular customer and associated with a cancelled scheduled delivery, the total an/or time-average amount spent on purchases by the particular customer and associated with a cancelled scheduled pickup, the total and/or time-average number of items purchased by the particular customer and associated with a cancelled scheduled delivery, and the total and/or time-average number of items purchased by the particular customer and associated with a cancelled scheduled pickup.

User database 320 may also store inter-purchase interval data 326. In some examples, inter-purchase interval data 326 may be extracted and/or derived from transactional data 321. In some implementations, membership computing device 102 may execute user attribute engine 306 to determine and generate, for each user, inter-purchase interval data 326 from transactional data 321. In some examples, inter-purchase interval data 326 may indicate the average number of days in-between each purchase made between the particular one of the customers of the e-commerce entity and the e-commerce entity (e.g., in-store and/or online).

Additionally, data repository 116 may include membership database 340. In some examples, membership database 340 may store member data 340A. In some examples, membership computing device 102 may obtain, from an additional computing device and/or system (not shown in FIG. 3) associated with an associated e-commerce entity, one or more elements of member data 340A and store the one or more elements of the member data 340A within membership database 340. The one or more elements of member data 340 may identify customer or users of the e-commerce entity previously and currently participating in a loyalty or membership program (trial or full). Examples of member data 340A include, but are not limited to, a unique identifier of a particular one of the customers of the e-commerce entity that has currently or previously participated in the loyalty or membership program (e.g., an alphanumeric identifier or login credential, a customer name, etc.), a label or tag identifying whether the particular customer is currently or previously a trial or full member, a timestamp indicating when the user joined the loyalty or membership program, information identifying the type of loyalty or membership program the particular customer signed up for (e.g., trial—15 day, trial 30 day, monthly full membership, and yearly full membership), and information identifying the remaining amount of time of a currently active membership of the particular customer.

User database 320 may also store non-member data 327. In some examples, non-member data 327 may be based on member data 340A. In some implementations, membership computing device 102 may execute user attribute engine 306 to determine non-member data 327 based on member data 340A. In some examples, non-member data 327 may identify customers or users of the e-commerce entity not currently participating in a loyalty or membership program. In such examples, executed user attribute engine 306 may compare user identifiers included in member data 340A and the user identifiers of user database 320 (e.g., transactional data 321, and/or engagement data 322) to identify user identifiers of user database 320 not included in member data 340A or are associated with user identifiers that correspond to users who were previously participating in the loyalty and membership program. Additionally, executed user attribute engine 306 can compare user identifiers included in member data 340A and the user identifiers of user database 320 to identify user identifiers of users who are included in user database 320 and member data 340A, and not currently participating in the loyalty and membership program. For example, executed user attribute engine 306 may analyze data elements of member data 340A associated with user identifiers included in both member data 340A and user database 320. Based on the analysis, executed user attribute engine 306 may determine whether the corresponding data elements indicate if the user of the identified user identifiers are associated with a lapsed or expired membership (e.g., compare the current time and date to at least data elements associated with information identifying the remaining amount of time of a currently active membership of the particular customer). Further, executed user attribute engine 306 may generate data identifying the user identifiers of users that are not currently participating in a loyalty or membership program (e.g., non-members), and store within corresponding user database 320, such as non-member data 327. In some examples, the data of user identifiers of non-member users may include a tag or label indicating the associated user or customer is a non-member.

Moreover, membership database 340 may store benefits data 340B. In some examples, membership computing device 102 may obtain, from an additional computing device and/or system (not shown in FIG. 3) associated with an associated e-commerce entity, one or more elements of benefits data 340B and store the one or more elements of benefits data 340B within membership database 340. The one or more elements of benefits data 340B may, for each of the one or more stores, identify one or more membership benefits that are available to customers or are accessible to customers, such as scan and go and fuel discounts. Examples of benefits data 340B include, but are not limited to, a unique identifier of a particular one of the stores of the e-commerce entity, such as store 109 (e.g., an alphanumeric identifier), geolocation data of the particular store (e.g., an address and/or longitudinal and latitudinal coordinates), and a description or a tag/label of each membership benefit available to the customers or are accessible to the customers at that particular store.

Data repository 116 may include store data 345 of one or more stores associated with membership system 100, such as store 109. In some instances, membership computing device 102 may execute ingestion engine 302 to obtain, from a particular one of the one or more stores, one or more elements of store data 345 of the particular store. Additionally, executed ingestion engine 302 may store the one or more elements of store data 345 of the particular store to data repository 116. In some examples, store data 345 may indicate one or more store features or characteristics of a particular one of the one or more stores, such as store 109. For example, a store feature of store 109 may include that store 109 is scan and go capable. In another example, a store feature of 109 may include that store 109 is pickup capable. In yet another example, a store feature of 109 may include that store 109 has available fuel stations. Further, membership computing device 102 may store in data repository 116, data characterizing, the store features or characteristics of the particular store, such as store 109, within a corresponding data repository 116, such as membership data.

In some examples, membership computing device 102 may determine what membership benefits are available for a particular one of the one or more stores associated with the e-commerce entity based on the store data 345 of the particular store. In such examples, benefits data 340B may data identifying all the membership benefits that are provided by the associated e-commerce entity. Additionally, membership computing device 102 may execute membership engine 308 to compare the store features of the particular store with all the membership benefits identified in benefits data 340B. Based on the comparison, executed membership engine 308 may identify one or more membership benefits that are specific to the particular store. For instance, executed membership engine 308 may determine that fuel discounts (the membership benefits) are available to store 109 because the identified store features of store 109 includes fuel pumps. Further membership engine 308 may generate one or more data elements that include a description or tag/label of the identified one or more membership benefits that are specific to store 109 and store the one or more data elements within corresponding membership database 340, such as benefits data 340B. In various examples, the one or more data elements may further include, a unique identifier of store 109 (e.g., an alphanumeric identifier), and geolocation information of store 109 (e.g., an address and/or longitudinal and latitudinal coordinates).

Data repository 116 may include machine learning database 350. Machine learning database may store machine learning data 350A of one or more machine learning models. The machine learning models, that when adaptively trained and validated, may be executed by membership computing device 102 to determine and generate output data 328 associated with a particular user or customer labeled or designated as a non-member. In some examples, membership computing device 102 may execute membership engine 308 to implement a set of operations to generate the output data 328. The set of operations may include identifying one or more user identifiers of non-member users or customers based on non-member data 327. Additionally, based on the user identifiers of the non-member users or customers, executed membership engine 308 may obtain one or more extracted, derived and obtained features or data associated with the user identifiers of the non-member users or customers. Examples of the one or more extracted, derived and obtained features or data associated with the user identifiers of the non-member users or customers include transactional data 321, engagement data 322, supplemental user data 323, consolidated data 324, fulfillment data 325, inter-purchase interval data 326, and/or benefits data 340B associated with the one or more user identifiers of non-member users or customers. Further executed membership engine 308 may apply a trained and validated machine learning model, such as logistic regression, decision tree process, random forest, a gradient boosted decision tree process (e.g., an XGBoost model) or a light gradient boosted model, to one or more extracted, derived and obtained features or data (e.g., transactional data 321, engagement data 322, supplemental user data 323, consolidated data 324, fulfillment data 325, inter-purchase interval data 326, benefits data 340B) associated with the user identifiers of the non-member users or customers.

Further, executed membership engine 308 may store output data 328 within user database 320. Output data 328 may be associated with a particular user or customer labeled or designated as non-member. Additionally, output data 328 may include a plurality of trial membership scores. Each trial membership score of the plurality of trial membership scores may be associated with a particular user or customer of an ecommerce entity. Additionally, each trial membership score of the plurality of trial membership scores may characterize a likelihood of an acquisition event of the corresponding user changing from a non-member status to a trial-member status.

In various implementations, membership engine 308 may perform operations that adaptively train a machine-learning or artificial-intelligence process/model to determine a likelihood of an acquisition event of a non-member of an ecommerce entity. In some examples, the acquisition event includes the non-member user/customer changing its status to a trial-member status. Additionally, membership engine 308 may adaptively train the machine-learning or artificial-intelligence process/model using training datasets associated with a first prior temporal interval (e.g., a "training" interval). In some examples the training datasets may be obtained from the extracted, derived or obtained data elements of transactional data 321, engagement data 322, supplemental user data 323, consolidated data 324, fulfillment data 325, inter-purchase interval data 326, non-member data 327, member data 340A, benefits data 340B and store data 345. Additionally, the obtained data elements of the extracted, derived or obtained data elements of transactional data 321, engagement data 322, supplemental user data 323, consolidated data 324, fulfillment data 325, inter-purchase interval data 326, non-member data 327, member data 340A, benefits data 340B and store data 345, may be of a first prior temporal interval.

Moreover, executed membership engine 308 may validate the adaptively trained machine-learning or artificial intelligence process/model using validation datasets associated with a second, and distinct, prior temporal interval. In some examples, the validation datasets may be obtained from the extracted, derived or obtained data elements of transactional data 321, engagement data 322, supplemental user data 323, consolidated data 324, fulfillment data 325, inter-purchase interval data 326, non-member data 327, member data 340A, benefits data 340B and store data 345. Additionally, the obtained elements of the extracted, derived or obtained data elements of transactional data 321, engagement data 322, supplemental user data 323, consolidated data 324, fulfillment data 325, inter-purchase interval data 326, non-member data 327, member data 340A, benefits data 340B and store data 345 may be of a second and distinct prior temporal interval. In various examples, executed membership engine 308 may validate the predictive capability and accuracy of the adaptively trained machine learning process/model based on elements of ground truth data incorporated within the validation datasets, or based on one or more computed metrics (that is based on the generated elements of output data and corresponding ones of validation datasets), such as, but not limited to, computed precision values, computed recall values, and computed area under curve (AUC) for receiver operating characteristic (ROC) curves or precision-recall (PR) curves. Once the machine learning model is trained and validated, executed membership engine 308 may store the trained and validated machine learning model in machine learning database 350.

Machine learning database 350 may store data of feature importance type models to determine and assess the contributions of each extracted, derived or obtained feature inputted into the trained and validated machine learning model that generated output data 328. In various implementations, machine learning database 350 may store SHAP model data 350B of a SHAP model. In such implementations, membership computing device 102 may execute expliability engine 310 to apply the SHAP model to the trained and validated machine learning model that generated output data 328.

User database 320 may also store explainability data 329. Explainability data 329 may include a set of values and the set of values may include multiple subsets of values. Each subset of values may be associated with one of the extracted features or data that were inputs to a trained and validated machine learning model that generated output data 328 of a particular non-member user/customer. Moreover, each value of a subset of values may be associated with a particular non-member user/customer, and may characterize a contribution of the corresponding feature to the output data generated by the trained and validated machine learning model. In some examples each value may each indicate the magnitude of the contribution the corresponding feature may have had on output data 328 of the particular non-member user/customer generated by the trained and validated machine learning model. Additionally, each value may indicate whether such contribution may have had a negative or positive contribution to the output data 328. In some examples, membership computing device 102 may implement a set of operations that generate the explainability data 329. In some instances, membership computing device 102 may execute explainability engine 310 to generate explainability data 329. In other instances, membership computing device 102 may apply a SHAP model to the trained and validated machine learning model.

In various implementations, executed explainability engine 310 may generate explainability data 329 for non-member users that are more likely to join or participate in a loyalty or membership program of an e-commerce entity. In such implementations, executed membership engine 308 may, for each non-member user or customer of the e-commerce entity, associate with or place into one of a set of bins/cohorts. The placement or association of a non-member user to a particular one of the set of bins/cohorts may be based on output data 328 of the non-member user, such as the corresponding trial-membership score of the corresponding non-member user or customer. Each bin/cohort may correspond to a predetermined range of trial-membership scores. For example, a first cohort of 0.0-0.099 may correspond to non-member users with a determined trial-membership score ranging between 0.0-0.099; a second cohort of 0.1-0.199 may correspond to non-member users with a determined trial-membership score ranging between 0.1-0.199; a third cohort of 0.2-0.299 may correspond to non-member users with a determined trial-membership score ranging between 0.2-0.299; a fourth cohort of 0.3-0.399 may correspond to non-member users with a determined trial-membership score ranging between 0.3-0.399; a fifth cohort of 0.4-0.499 may correspond to non-member users with a determined trial-membership score ranging between 0.4-0.499; a sixth cohort of 0.5-0.599 may correspond to non-member users with a determined trial-membership score ranging between 0.5-0.599; a seventh cohort of 0.6-0.699 may correspond to non-member users with a determined trial-membership score ranging between 0.6-0.699; an eighth third cohort of 0.7-0.799 may correspond to non-member users with a determined trial-membership score ranging between 0.7-0.799; a ninth cohort of 0.8-0.899 may correspond to non-member users with a determined trial-membership score ranging between 0.8-0.899; and a tenth cohort of 0.9-1.0 may correspond to non-member users with a determined trial-membership score ranging between 0.9-1.0. Further, and in such implementations, executed explainability engine 310 may generate explainability data for non-member users in bins/cohorts which a predetermined range of trial membership scores above 0.5 or (50%). Additionally, membership computing device 102 may store in data repository 116, the explainability data, within a corresponding data repository 116, such as explainability data.

In some examples, membership computing device 102 may implement a set of operations that determine and generate explainability data 329 for a particular one of a set of bins/cohorts. For example, following the example above, membership computing device 102 may determine explainability data 329 for a second cohort of 0.6-0.699. Additionally, the explainability data 329 may include a set of values associated with output data 328 including trial-membership scores ranging between 0.6-0.699 and the set of values may include multiple subsets of values. Each of the multiple subset of values may be associated with one of the extracted, derived or obtained features or data that were inputs to the trained and validated machine learning model that generated output data 328 including trial-membership scores ranging between 0.6 and 0.699. Moreover, each value of a subset of values may be associated with a particular non-member user (e.g., user identifier of the particular non-member user), and may characterize a contribution of the corresponding extracted, derived or obtained features or data to the generated trial-membership scores ranging between 0.6-0.699. In some examples the values may each indicate the magnitude of the contribution the corresponding feature may have had on such trial-membership scores, as well as whether such contribution may have had a negative or positive contribution to such trial-membership scores. In some instances, executed explainability engine 310 may apply a SHAP model to the trained and validated machine learning model that generated output data associated with a particular bin/cohort, such as a bin/cohort that corresponds to a trial-membership score ranging from 0.6-0.699. The SHAP model may generate explainability data 329 for the particular bin/cohort. In such instances, the explainability data 329 may include a set of values, such as Shapley values.

In some examples, explainability engine 310 may implement a set of operations that determine and generate explainability data 329 for a particular non-member user/customer. For example, explainability engine 310 may determine explainability data 329 for a particular non-member user/customer with output data 328 including a trial-membership score of 0.85. Additionally, the explainability data 329 may include a set of values associated with the output data 328 of the particular non-member customer (e.g., output data 328 that includes the trial-membership score of 0.85). Moreover, each value of the set of values may be associated with each of the extracted, derived or obtained features or data that were inputs to the trained and validated machine learning model that generated the trial-membership score of the particular non-member user (e.g., trial membership score of 0.85). In such an example, the extracted, derived or obtained features or data may be associated with the particular non-member user. Further, each value may characterize a contribution of the corresponding extracted, derived or obtained feature or data to the generated trial-membership score associated with the particular non-member user (e.g., trial membership score of 0.85). In some examples the values may each indicate the magnitude of the contribution the corresponding extracted, derived or obtained feature may have had on the trial-membership score associated with the particular non-member user, as well as whether such contribution may have had a negative or positive contribution to the trial-membership score associated with the particular non-member user. In some instances, explainability engine 310 may apply a SHAP model to the trained and validated machine learning model that generated output data of the particular non-member user. The SHAP model may generate explainability data 329 associated with the particular non-member user. In such instances, the explainability data 329 may include a set of values, such as Shapley values.

For each feature and associated explainability data 329 including the associated set of values, membership computing device 102 may, for a particular one of non-member users of an e-commerce entity, determine whether to implement operations associated with an actionable feature. As described herein, an actionable feature, is an extracted, derived, or obtained feature of the particular non-member user that, are modifiable through operations implemented by the explainability engine 310. Additionally, if the extracted, derived or obtained feature is modified, the modification of such feature may increase or decrease a trial-membership score. Examples of actionable features include, transactional and engagement type features or features that are extracted, obtained or derived from transactional data 321 and engagement data 322.

Further, membership computing device 102 may execute activations engine 312 to determine whether to implement operations associated with an actionable feature by comparing explainability data 329 of the particular non-member user to the explainability data 329 of a bin/cohort with a higher range of trial-membership scores. For example, activations engine 312 may compare a distribution of values of explainability data 329 associated with extracted, derived, or obtained features and data of a first bin/cohort with a corresponding first range of trial-membership scores to the values of explainability data 329 associated with extracted, derived, or obtained features and data of a particular one of the non-member users. The particular non-member user may be associated with a second bin/cohort with corresponding second range of trial-membership scores, and the second range of trial-membership scores may be a lower range than the first range of trial-membership scores. Executed activations engine 312 may identify, for each extracted, derived or obtained features of the first bin/cohort, portions of the distribution of corresponding values that positively affect the corresponding first range of trial-membership scores or positive portion(s), portions of the distribution of corresponding values that are negatively affect the corresponding first range of trial-membership scores or negative portion of values portion, and an inflection point (the point in the distribution of corresponding values of a particular extracted, derived, or obtained features of the first bin that begin to change from negatively contributing to the first range of trial-membership scores, or vice-versa). Further, based on the comparison, the identified positive portions, the identified negative portions and the identified inflection point, executed activations engine 312 may, for a particular actionable feature of the extracted, derived, or obtained features of the first cohort/bin, determine whether, the corresponding value of the particular non-member user is within the identified negative portion or the identified positive portion.

In examples where, for a particular actionable feature, executed activations engine 312 determines the corresponding value of the particular non-member user is within the negative portion, executed activations engine 312 may implement a set of operations associated with the particular actionable feature. Otherwise, activations engine 312 may not implement operations associated with the particular actionable feature. For example, activations engine 312 may determine that, for a particular non-member user, a value of a particular actionable feature associated with the number of scheduled deliveries is within the negative portion associated with the actionable feature associated with the number of scheduled deliveries. For instance, the feature value of the actionable feature associated with the number of scheduled deliveries and the particular non-member user is within the portion of the distribution of values associated with such actionable feature and the first bin/cohort that is determined as negatively effecting the corresponding first range of trial-membership scores.

In various examples, the operations implemented by executed activations engine 312 may be associated with a particular actionable feature (e.g., scheduled deliveries). In such examples, the operations implemented by executed activations engine 312 may be based on and/or in response to executed activations engine 312 determining whether, for the particular actionable feature, the corresponding value of the explainability data 329 of a particular non-member user is within a negative or positive portion of the corresponding distribution of values of the explainability data 329 of a bin/cohort with a higher range of trial-membership scores. For example, for a particular actionable feature, number of scheduled deliveries, executed activations engine 312 determines the corresponding value of a particular non-member user is determined as being within a corresponding negative portion associated with a second bin/cohort with a higher range of trial-membership scores than the particular non-member user. As such, based on such determinations, activations engine 312 may implement a set of operations associated with the particular actionable feature, the number of scheduled deliveries.

In some examples, such operations may include, executed activations engine 312 communicating notification instructions to a mobile computing device (e.g., mobile computing device 110, 112, 114) of the particular non-member user. The notification instruction may cause the mobile computing device of the particular non-member user to generate a notification that includes content related to discounted or free scheduled deliveries. In other examples, such operations include, executed activations engine 312 communicating notification instructions to a mobile computing device (e.g., mobile computing device 110, 112, 114) of the particular non-member user. The notification instruction may cause the mobile computing device of the particular non-member user, while the particular non-member user is browsing on a retailer website associated with an associated e-commerce entity user, to generate a notification (e.g., as a pop up notification, banner, etc.) that includes content related to discounted or free scheduled deliveries. In various examples, the operations may include, executed activations engine 312 causing communication (either directly or indirectly through communications with another computing system) of an email to the mobile computing device (e.g., mobile computing device 110, 112, 114) of the particular non-member user that includes content related to discounted or free scheduled deliveries. Additionally, or alternatively, the content may be related generally to the benefits of the loyalty or membership program. For example, along with the content regarding the discounted or free scheduled deliveries, a notification or email communicated to the mobile computing device of the particular non-member user may also include content regarding the benefits of the loyalty or membership program (e.g., savings that may be available to the particular non-member user).

In various examples, operations that activations engine 312 may implement for a particular actionable feature may be directed to increase the engagements between a corresponding non-member user and an associated e-commerce entity. For example, activations engine 312 may determine that, for a particular non-member user, a value of a particular actionable feature associated with the inter-purchase interval is within a negative portion of the corresponding distribution of values of the explainability data 329 of a second bin/cohort. The second bin/cohort may have a higher range of trial-membership scores than the trial-membership score of the particular non-member user. Additionally, based on such a determination, executed activations engine 312 may implement operations associated with the particular actionable feature associated with the inter-purchase interval.

In some examples, such operations may include, executed activation engine 312 causing content, either directly or indirectly via another computing system, to be generated on a mobile computing device (e.g., mobile computing device 110, 112, 114) of the particular non-member user. In some instances, executed activation engine 312 may communicate with a second computing system configured to identify one or more items users (including non-member users and users that are currently participating in a loyalty or membership program of an e-commerce entity) of the e-commerce entity may want to purchase at a future time interval. In such instances, executed activations engine 312 may transmit data identifying the particular non-member user (e.g., a user identifier) along with transactional data 321 and engagement data 322 associated with the particular non-member user to the second computing system. The second computing system, may identify one or more items the particular non-member user may want to purchase at a future interval. Additionally, the second computing system may generate data identifying the one or more items. Such data may be communicated to the mobile computing device of the particular non-member user, either by the second computing system directly or via the executed activations engine 312. In some examples, an application program associated with the e-commerce entity and executing on the mobile computing device, may generate the notification including content about the identified one or more items or a particular user interface with such content about the identified one or more items. In other examples, a retailer website the non-member user is browsing through on the mobile computing device may generate a webpage or interface that presents such content (e.g., on a banner) about the identified one or more items.

Methodology

Figure 4:
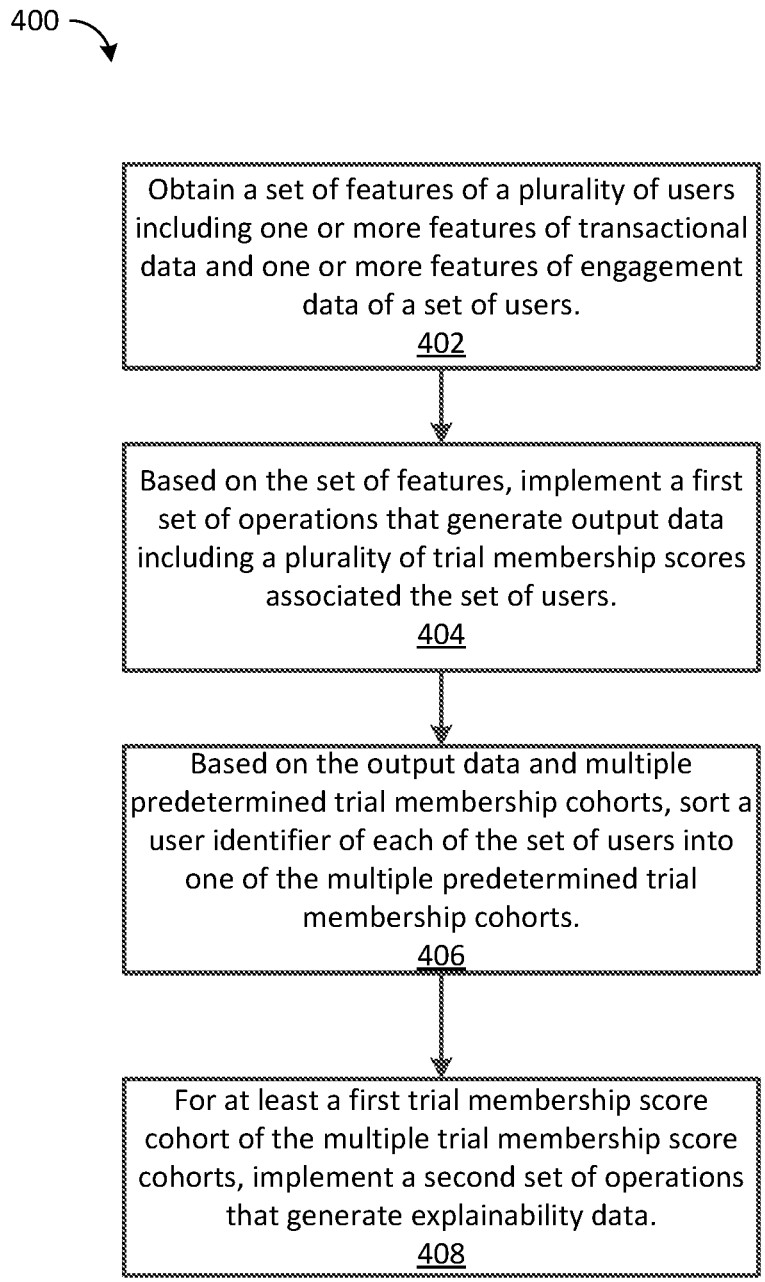
FIG. 4 illustrates an example method that can be carried out by the membership computing device 102 of FIG. 1.

FIG. 4 illustrates an example method that can be carried out by the membership computing device 102 of FIG. 1.

Figure 5:
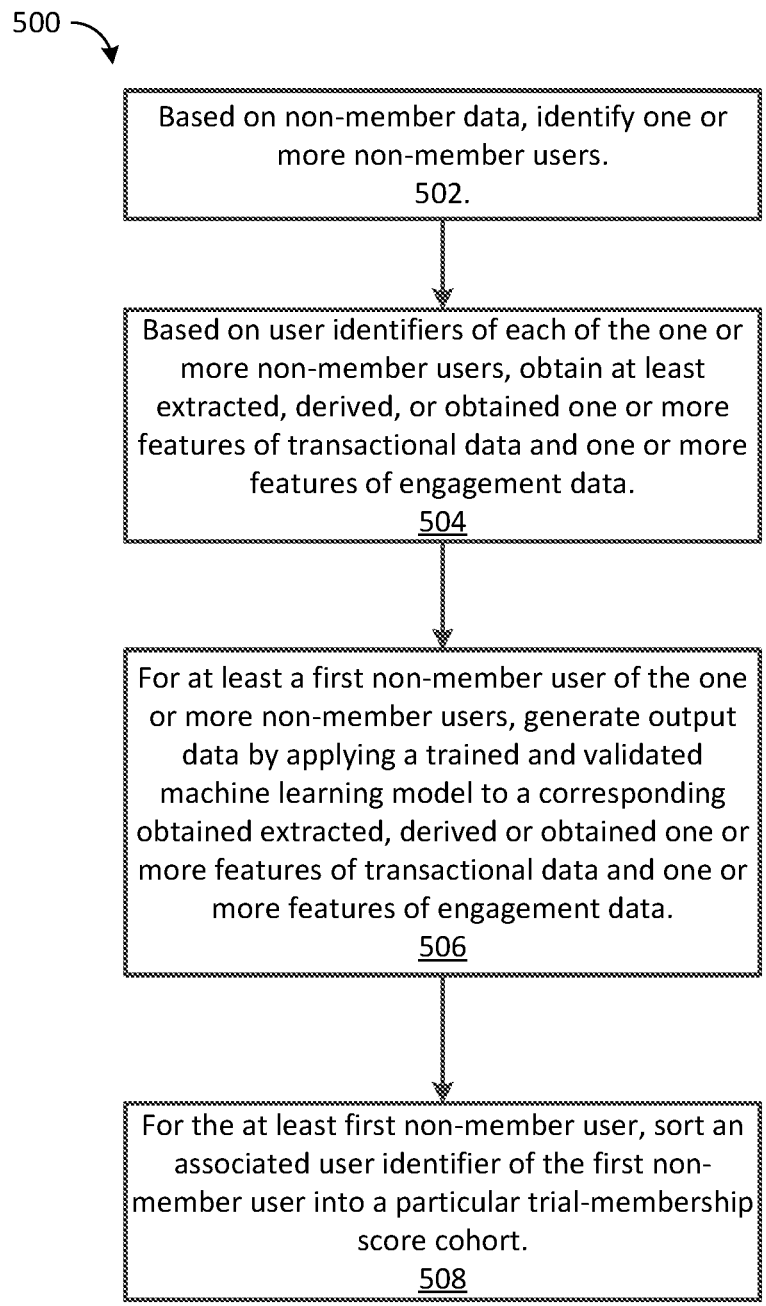
FIG. 5 illustrates an example method that can be carried out by the membership computing device 102 of FIG. 1.
Figure 6:
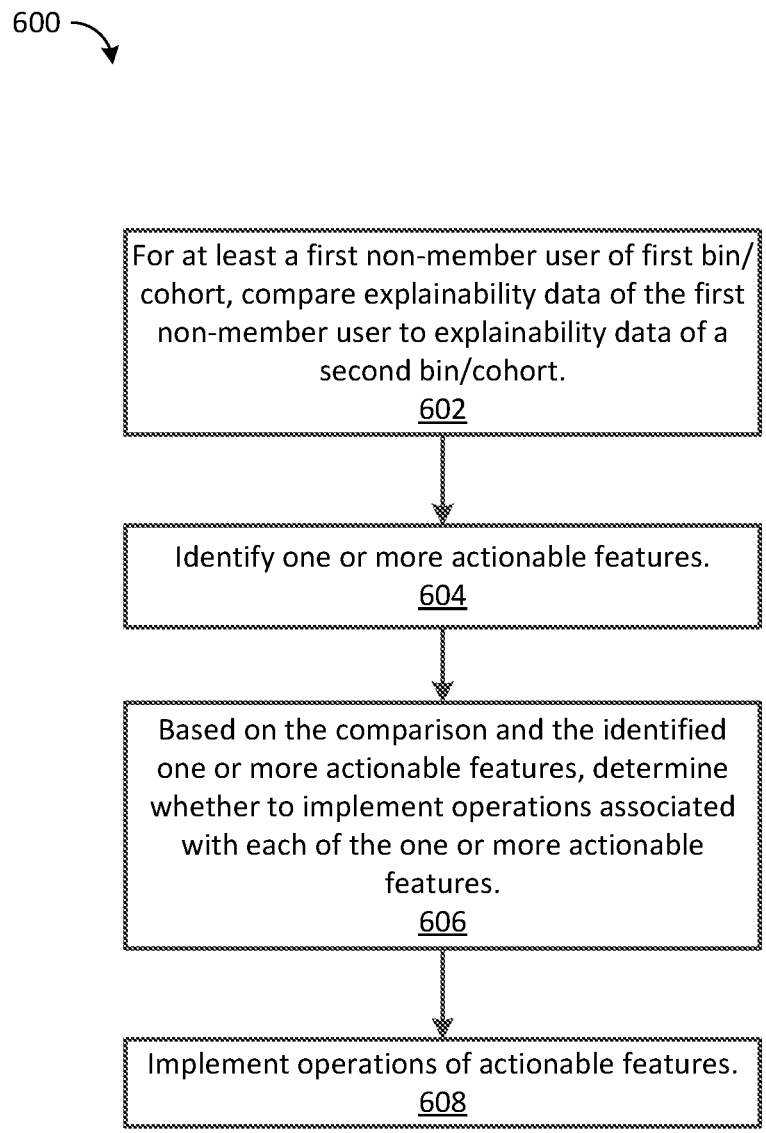
FIG. 6 illustrates an example method that can be carried out by the membership computing device 102 of FIG. 1.

FIG. 5 illustrates an example method that can be carried out by the membership computing device 102 of FIG. 1. FIG. 6 illustrates an example method that can be carried out by the membership computing device 102 of FIG. 1. In describing an example method of FIGS. 4, 5, and 6, reference is made to elements of FIG. 1-3 for purpose of illustrating a suitable component for performing a step or sub-step being described.

With reference to example method 400 of FIG. 4, membership computing device 102 may, obtain a set of features of a set of users including one or more features of transactional data 321 of a plurality of users and one or more features of engagement data 322 of a plurality of users (402). In some examples, membership computing device 102 may execute membership engine 308 to obtain one or more extracted, derived and obtained features or data, such as features of transactional data 321 and engagement data 322 (e.g., supplemental user data 323, consolidated data 324, fulfillment data 325, inter-purchase interval data 326, click data 322B, add-to-cart data 322C, impressions data 322D, views data 322E, search query data 322F), associated with the user identifiers of the set of user. In other examples, the set of users may be non-member users Additionally, based on the set of features, membership computing device 102, may implement a first set of operations that generate output data including a plurality of trial membership scores associated the set of users (404). In some examples, executed membership engine 308 may implement a first set of operations that generate output data including a plurality of trial membership scores associated the set of users, based on the set of features. Additionally, the set of operations may include applying a trained and validated machine learning model, such as logistic regression, decision tree process, light Gradient Boosting Machine (GBM) GMB-model, random forest or a gradient boosted decision tree process (e.g., an extreme Gradient Boosting (XGB) model), to one or more extracted, derived and obtained features or data (e.g., transactional data 321, engagement data 322, supplemental user data 323, consolidated data 324, fulfillment data 325, inter-purchase interval data 326, benefits data 340B) associated with the set of users.

Moreover, based on the output data and multiple predetermined trial membership cohorts, membership computing device 102 may sort a user identifier of each of the set of users into one of the multiple predetermined trial membership cohorts (406). In some examples, based on a trail-membership score of each corresponding user of the set of users, executed membership engine 308 may place or associate a user identifier of each of the set of users into one of the multiple predetermined trial membership cohorts or bins. Each bin/cohort may correspond to a predetermined range of trial-membership scores.

Further, for at least a first trial membership score cohort of the multiple trial membership score cohorts, membership computing device 102 may implement a second set of operations that generate explainability data 329 (408). In some examples, explainability data 329 may include a set of values and each value of the set of values may be associated with each of the set of features. Additionally, each value of the set of values may characterize a contribution of the corresponding feature to the trial membership scores associated with at least the first trial membership score cohort. In some instances, membership computing device 102 may execute explainability engine 310 to implement the second set of operations that generate the explainability data 329. Additionally, the second set of operations may include applying a feature importance type model, such as a SHAP model, to the trained and validated machine learning model that generated the output data 328 associated with the first trial membership score cohort.

With reference to example method 500 of FIG. 5, membership computing device 102 may implement a set of operations to generate output data 328 that includes based on non-member data 327, identifying one or more non-member users (502) or a set of non-member users. In some examples, membership computing device 102 may execute membership engine 308 to determine and identify non-member users/customers. As described herein, the non-member users/customers are users/customers of the e-commerce entity that are determined or identified as currently not participating in a loyalty or membership program of the e-commerce entity, based on non-member data 327.

Additionally, based on user identifier of each of the one or more non-member users, membership computing device 102 may obtain at least one or more extracted, derived, or obtained features or data of transactional data 321, and features or data of engagement data 322 (504) associated with each of the one or more non-member users. In some examples, executed membership engine 308 may obtain at least one or more extracted, derived, or obtained one or more features or data of transactional data 321, and one or more features or data of engagement data 322 associated with the user identifier of each of the one or more non-member users.

Moreover, for at least a first non-member user of the one or more non-member users, membership computing device 102 may generate output data 328 by applying a trained and validated machine learning model to a corresponding extracted, derived or obtained one or more features or data of the transactional data 321 and one or more features or data of the engagement data 322 (506). In some examples, executed membership engine 308 may apply a trained and validated machine learning model, such as logistic regression, decision tree process, random forest, a gradient boosted decision tree process (e.g., an XGBoost model) or a light gradient boosted model, to the extracted, derived or obtained one or more features or of the transactional data 321 and one or more features of the engagement data 322.

Further, for at least the first non-member user, membership computing device 102 may sort an associated user identifier of the first non-member user into a particular trial-membership score cohort (508). In such examples the particular trial-membership score cohort may correspond to a particular predetermined range of trial membership scores. Additionally, based on the output data 328 of the first non-member user, executed membership engine 308 may place or associate the first non-member user into a trial membership score cohort/bin where the trial membership score of the first non-member user is within the range of trial membership scores corresponding to the trial membership cohort/bin. For example, the trial membership score of the first non-member user may be 0.712. Additionally, executed membership engine 308 may place the identifier of the first non-member user into a cohort/bin with a corresponding trial membership scores ranging between 0.7 and 0.799.

With reference to example method 600 of FIG. 6, membership computing device 102 may determine, for at least a first non-member user of a first bin/cohort, whether to implement operations associated with an actionable feature. For example, membership computing device 102 may make such a determination by comparing explainability data 329 of the first non-member user to explainability data of a second bin/cohort (602). In some examples, first non-member user may be associated with a first bin/cohort with corresponding first range of trial-membership scores that is lower than a second range of trial-membership scores corresponding to the second bin/cohort. In such examples, membership computing device 102 may execute activations engine 312 to compare distribution of values of explainability data 329 associated with extracted, derived, or obtained features and data of the second bin/cohort to the values of explainability data 329 associated with extracted, derived, or obtained features and data of the first non-member user. In some examples, executed activations engine 312 may identify, for each extracted, derived or obtained features of the second bin/cohort, portions of the distribution of corresponding values that positively affect the corresponding second range of trial-membership scores or positive portion(s), portions of the distribution of corresponding values that are negatively affect the corresponding second range of trial-membership scores or negative portion of values portion, and an inflection point (the point in the distribution of corresponding values of a particular extracted, derived, or obtained features of the second bin that begin to change from negatively contributing to the second range of trial-membership scores, or vice-versa).

Moreover, membership computing device 102 (e.g., executed activations engine 312) may identify one or more actionable features (604), based on the extracted, derived or obtained feature and data of the second bin/cohort and the first non-member user. As described herein an actionable feature, is an extracted, derived, or obtained feature of the particular non-member user that, are modifiable through operations implemented by the activations engine 312. Additionally, if the extracted, derived or obtained feature is modified, the modification of such feature may increase or decrease a trial-membership score. Examples of actionable features include, transactional and engagement type features or features that are extracted, obtained or derived from transactional data 321 and engagement data 322 (e.g., features or data of consolidated data 324, fulfillment data 325, and inter-purchase interval data 326).

Further, based on the comparison and for the identified one or more actionable features, membership computing device 102 may determine whether to implement operations associated with each of the one or more actionable features (606). In some examples, executed activations engine 312 may, based on the comparison, the identified positive portions, the identified negative portions and the identified inflection point, and for a particular identified actionable feature of the extracted, derived, or obtained features of the second cohort/bin, determine whether, the corresponding value of the first non-member user is within the identified negative portion or the identified positive portion. Further, executed activations engine 312 may determine whether to implement operations associated with the particular identified actionable feature, based on whether the corresponding value of the first non-member user is within the identified negative portion or the identified positive portion.

Membership computing device 102 may implement operations of actionable features (608) that are determined as being within the negative portion of the second bin/cohort. In some examples, executed activations engine 312 may, for a particular one of the one or more actionable features, determine the corresponding value of the first non-member user is within the negative portion of the second bin/cohort. Additionally, based on such a determination, activations engine 312 may implement a set of operations associated with the particular actionable feature In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a processor; and
a non-transitory memory storing instructions, that when executed, cause the processor to:
receive, from a workstation, an identifier corresponding to a store and a first set of data elements of a set of non-member users including one or more data elements of transactional data and one or more data elements of engagement data, wherein at least one data element of the one or more data elements of transactional data incorporates store information for an item purchase by a non-member user of the set of non-member users;
store the identifier and the first set of data elements in a non-member database;
receive, from a server system, a second set of data elements for order information for the set of non-member users;
store the second set of data elements for the order information for the set of non-member users in a transactional database;

based on the identifier, the first set of data elements, and the second set of data elements, implement a first set of operations that generate output data including a plurality of trial membership scores associated with the set of non-member users, each trial membership score of the plurality of trial membership scores being associated with a particular non-member user of the set of non-member users and characterizing a likelihood of an acquisition event of the corresponding non-member user changing from a non-member status to a trial-member status;

based on the output data and multiple predetermined trial membership score cohorts, sort a user identifier of each of the set of non-member users into one of the multiple predetermined trial membership score cohorts, each of the multiple predetermined trial membership score cohorts representing one of multiple predetermined range of trial membership scores;

for at least a first predetermined trial membership score cohort of the multiple predetermined trial membership score cohorts, implement a second set of operations that generate explainability data associated with at least the first predetermined trial membership score cohort; and for a non-member user of the set of non-member users with a highest trial membership score, send, to a mobile computing device of the non-member user, a notification related to a trial membership.

2. The system of claim 1, wherein the explainability data includes a magnitude of contribution by a corresponding data element of the set of data elements on one or more trial membership scores of the plurality of trial membership scores and a set of values, the set of values including multiple subset of values and each subset of values being associated with one of the set of data elements.

3. The system of claim 2, wherein each value of the set of values characterizes a contribution of a corresponding data element to the trial membership scores associated with at least the first predetermined trial membership score cohort.

4. The system of claim 1, wherein the instructions cause the processor to:
based on a trial membership score associated with a first user of the set of non-member users associated with the first predetermined trial membership score cohort, implement a third set of operations that generate explainability data associated with the first user.

5. The system of claim 1, wherein the first set of operations includes applying a trained and validated machine learning model to the first set of data elements.

6. The system of claim 5, wherein the trained and validated machine learning model is a gradient boosted tree model.

7. The system of claim 5, wherein the second set of operations includes applying a SHapley Additive explanations (SHAP) model to the trained and validated machine learning model.

8. The system of claim 1, wherein the instructions cause the processor to:
receive one or more data elements of supplemental user data of the first set of non-member users; and
wherein the implementation of the first set of operations that generate the output data is further based on the one or more data elements of supplemental user data.

9. The system of claim 1, wherein the instructions cause the processor to:
obtain features of benefits data associated with the set of non-member users; and
wherein the implementation of the first set of operations that generate the output data is further based on the data elements of benefits data.

10. The system of claim 1, wherein the instructions cause the processor to:
determine at least a first activation of a plurality of activations associated with the first predetermined trial membership score cohort, each of the plurality of activations being respectively associated with a computing system of a plurality of computing systems.

11. The system of claim 10, wherein the instructions cause the processor to:
for at least the first activation, transmit instructions to the computing system respectively associated with the first activation causing the computing system to communicate data associated with the first activation with at least a user device of a user associated with the first predetermined trial membership score cohort.

12. The system of claim 10, wherein each activation of the plurality of activations being associated with each predetermined trial membership score cohort of the multiple predetermined trial membership score cohorts.

13. A computer-implemented method comprising:
receiving, by a processor and from a workstation, an identifier corresponding to a particular store and a first set of data elements of a set of non-member users including one or more data elements of transactional data and one or more data elements of engagement data, wherein at least one data element of the one or more data element of transactional data incorporates store information for an item purchase by a non-member user of the set of non-member users;
storing the identifier and the first set of data elements in a non-member database;
receiving, from a server system, a second set of data elements for order information for the set of non-member users;
storing the second set of data elements for the order information for the set of non-member users in a transactional database;
based on the identifier, the first set of data elements, and the second set of data elements, implementing, by the processor, a first set of operations that generate output data including a plurality of trial membership scores, each trial membership score of the plurality of trial membership scores being associated with a particular non-member user of the set of non-member users and characterizing a likelihood of an acquisition event of the corresponding non-member user changing from a non-member status to a trial-member status;
based on the output data and multiple predetermined trial membership score cohorts, sorting, by the processor, a user identifier of each of the set of non-member users into one of the multiple predetermined trial membership score cohorts, each of the multiple predetermined trial membership score cohorts representing one of multiple predetermined range of trial membership scores;
for at least a first predetermined trial membership score cohort of the multiple predetermined trial membership score cohorts, implementing, by the processor, a second set of operations that generate explainability data associated with the first predetermined trial membership score cohort; and for at least one non-member user of the set of non-member users with a higher trial membership score than another non-member user of the set of non-member users, sending, to a mobile computing device of the at least one non-member user, a notification related to a trial membership.

14. The computer-implemented method of claim 13, further comprising:

based on a trial membership score associated with a first user of the set of non-member users associated with the first predetermined trial membership score cohort, implementing a third set of operations that generate explainability data associated with the first user.

15. The computer-implemented method of claim 13, wherein the first set of operations includes applying a trained and validated machine learning model to the first set of data elements.

16. The computer-implemented method of claim 15, wherein the trained and validated machine learning model is a gradient boosted tree model.

17. The computer-implemented method of claim 15, wherein the second set of operations includes applying a SHapley Additive explanations (SHAP) model to the trained and validated machine learning model.

18. The computer-implemented method of claim 15, further comprising:

obtaining one or more data elements of supplemental user data of the set of non-member users; and wherein the first set of operations that generate the output data is further based on the one or more data elements of supplemental user data.

19. The computer-implemented method of claim 15, further comprising:

obtaining data elements of benefits data associated with the set of non-member users; and wherein the implementation of the first set of operations that generate the output data is further based on the data elements of the benefits data.

20. A non-transitory computer readable medium storing instructions, that when executed by at least one processor, causes a system device to:

receive, from a workstation, an identifier corresponding to a store and a first set of data elements of a set of non-member users including one or more data elements of transactional data and one or more data elements of engagement data, wherein at least one data element of the one or more data elements of transactional data incorporates store information for an item purchase by a non-member user of the set of non-member users;

store the identifier and the first set of data elements in a non-member database;

receive, from a server system, a second set of data elements for order information for the set of non-member users;

store the second set of data elements for the order information for the set of non-member users in a transactional database;

based on the identifier, the first set of data elements, and the second set of data elements, implement a first set of operations that generate output data including a plurality of trial membership scores associated with the set of non-member users, each trial membership score of the plurality of trial membership scores associated with a particular non-member user of the set of non-member users and characterizing a likelihood of an acquisition event of the corresponding non-member user changing from a nonmember status to a trial-member status;

based on the output data and multiple predetermined trial membership score cohorts, sort a user identifier of each of the set of non-member users into one of the multiple predetermined trial membership score cohorts, each of the multiple predetermined trial membership score cohorts representing one of multiple predetermined range of trial membership scores;

for at least a first predetermined trial membership score cohort of the multiple predetermined trial membership score cohorts, implement a second set of operations that generate explainability data associated with the first predetermined trial membership score cohort; and for at least one non-member user of the set of non-member users with a higher trial membership score than another non-member user of the set of non-member users, send, to a mobile computing device of the at least one non-member user, a notification related to a trial membership.

* * * * *

UNITED STATES PATENT AND TRADEMARK OFFICE
CERTIFICATE OF CORRECTION

PATENT NO. : 12,288,235 B2
APPLICATION NO. : 17/647297
DATED : April 29, 2025
INVENTOR(S) : Aysenur Inan et al.

It is certified that error appears in the above-identified patent and that said Letters Patent is hereby corrected as shown below:

In the Claims

Claim 20, Column 31, Line 44, delete "system"

Signed and Sealed this
Tenth Day of June, 2025

Coke Morgan Stewart
*Acting Director of the United States Patent and Trademark Office*